Feb. 23, 1965  J. G. LORD  3,170,622
VOTING MACHINE
Filed Feb. 1, 1963  3 Sheets-Sheet 1
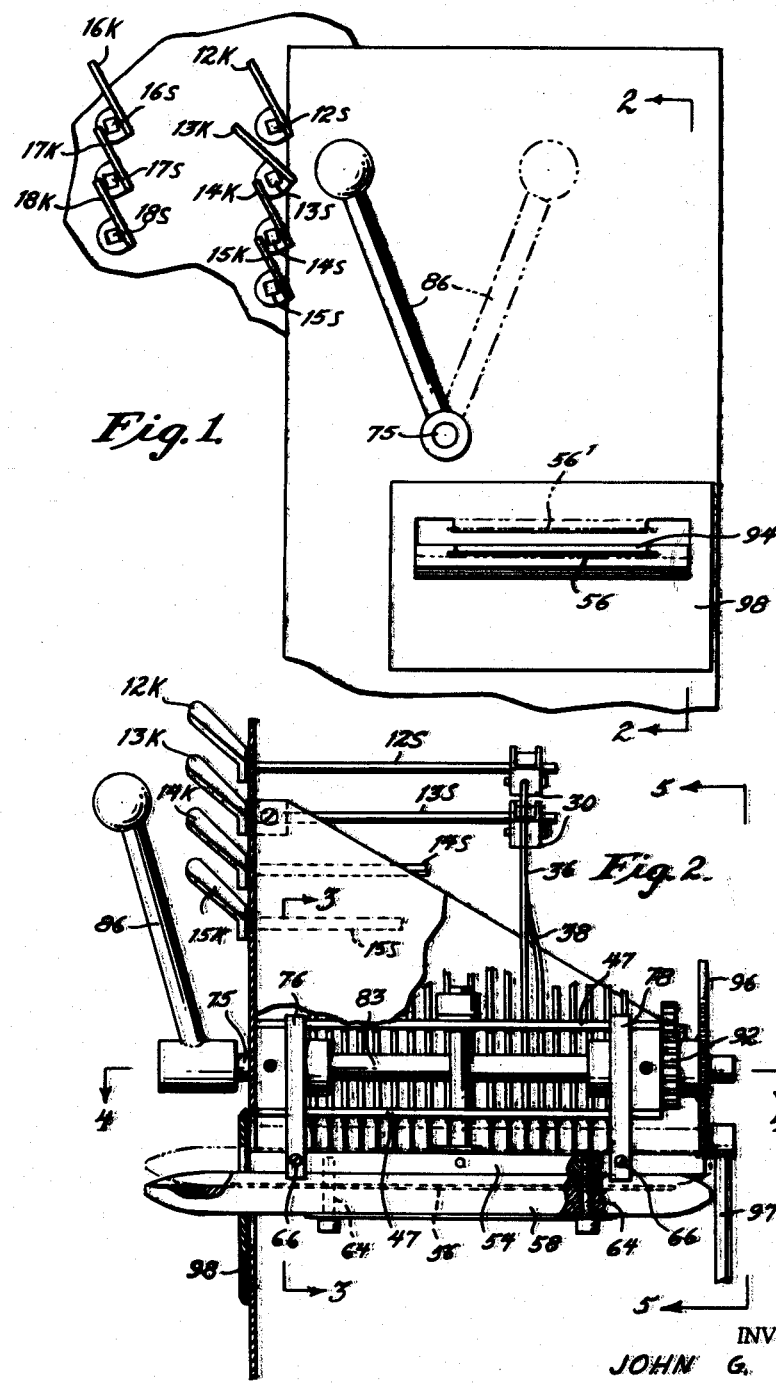
INVENTOR.
JOHN G. LORD
BY
ATTORNEY

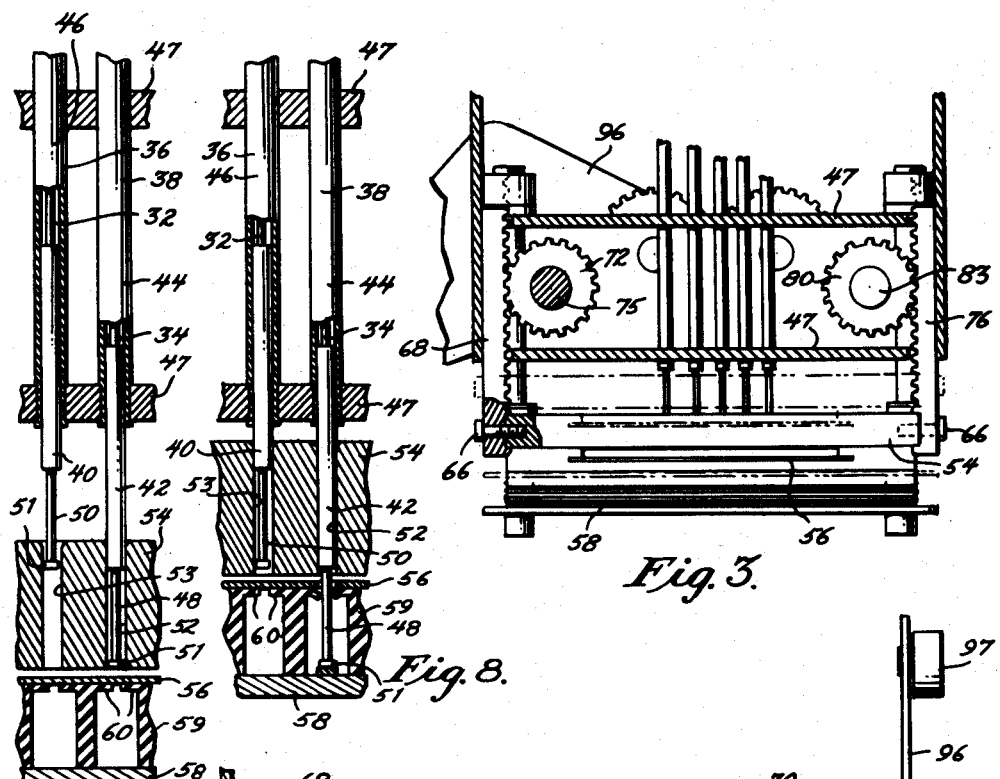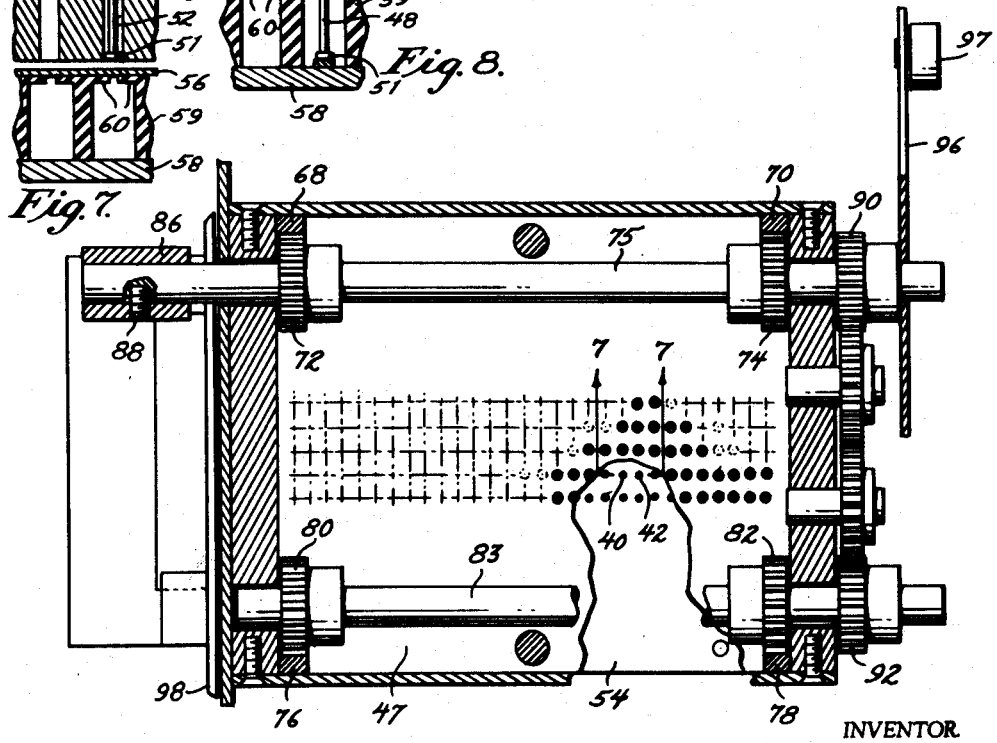

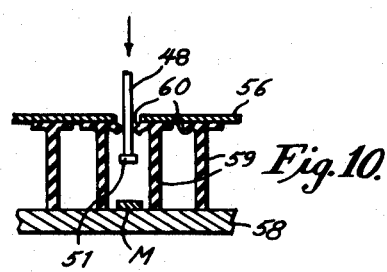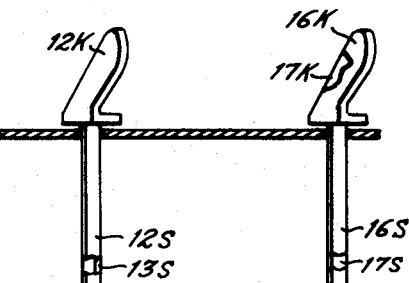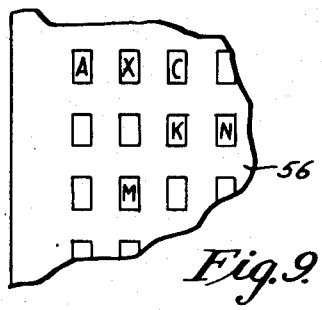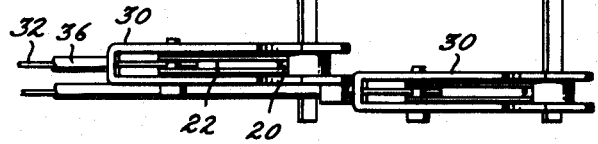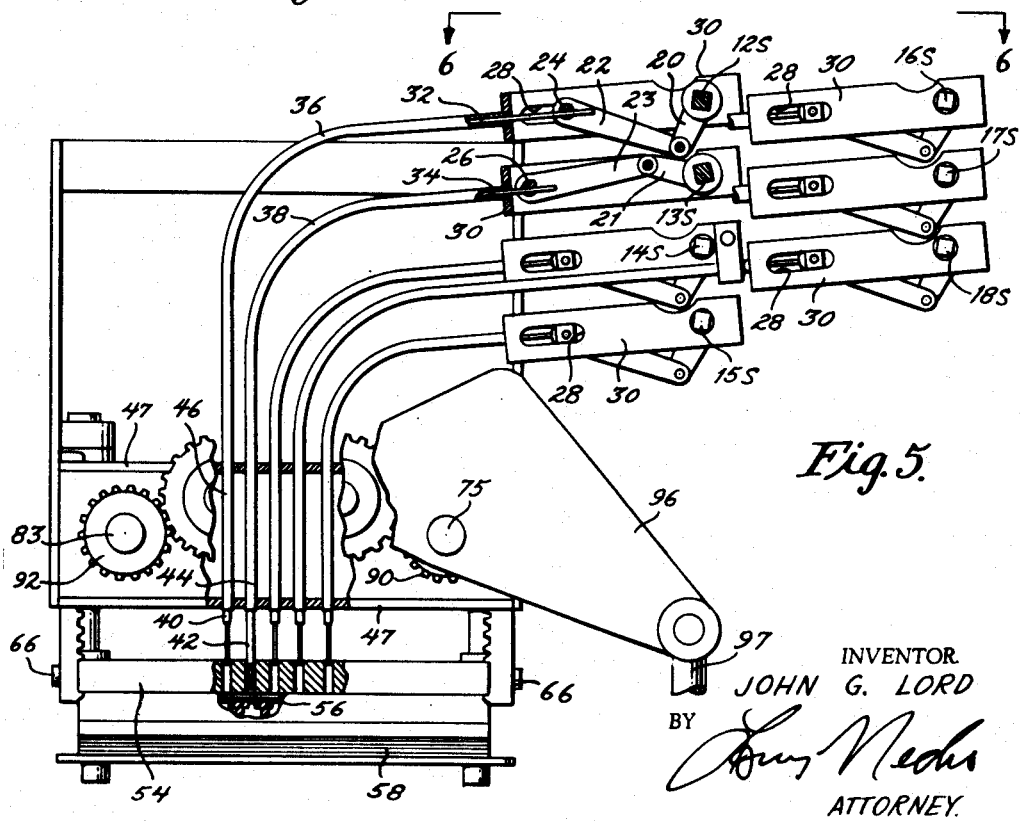

United States Patent Office 3,170,622
Patented Feb. 23, 1965

3,170,622
VOTING MACHINE
John G. Lord, Swarthmore, Pa.
(6 W. 6th St., Chester, Pa.)
Filed Feb. 1, 1963, Ser. No. 255,520
1 Claim. (Cl. 235—50)

This invention relates to a voting machine which is compact, inexpensive, and easy to operate; which can be used independently or as an adjunct of a conventional voting machine of the type shown, for example, in Patents 1,096,762 and 2,054,102, and other Shoup patents, without any alteration of the structure or operation of said conventional machines; which, when used independently, or as an adjunct of a conventional voting machine, will produce various types of information in addition to how many votes were cast for a candidate, or pro or con a question placed on a ballot; which can be used for opinion sampling to indicate trends and group, as well as individual, reaction studies; and which permits a voter to change his mind, but which, once the vote is cast, makes it impossible for the voter to vote again.

Other features will become apparent from the following specification and the accompanying drawings in which:

FIG. 1 is a fragmentary and diagrammatic elevational view of the front of the machine, or the face thereof, which carries the keys or handles which rotate the vote-casting spindles.

FIG. 2 is a view, partly in section and partly in elevation, looking in the direction of line 2—2 on FIG. 1.

FIG. 3 is an enlarged, fragmentary view, partly in section and partly in elevation, looking in the direction of line 3—3 on FIG. 2.

FIG. 4 is an enlarged, fragmentary view, partly in section, looking in the direction of line 4—4 on FIG. 2.

FIG. 5 is a view, partly in section and partly in elevation, looking in the direction of line 5—5 on FIG. 2, certain parts being omitted or broken away, better to show the operative mechanism.

FIG. 6 is an enlarged, fragmentary, sectional view looking in the direction of line 6—6 on FIG. 5, showing details of the vote-casting spindles.

FIG. 7 is an enlarged, fragmentary view showing the first step in using the machine.

FIG. 8 is a similar to FIG. 7, but showing the second step in using the machine.

FIG. 9 is a fragmentary top plan view of a conventional, commercially available (I.B.M.) punch card for use with the machine of the present invention.

FIG. 10 is an enlarged, fragmentary, sectional view showing a conventional, commercially available punch card supporting board (I.B.M.).

In FIG. 1, there is shown a few voting keys 12-K to 18-K which are arranged in two columns, but this is only by way of illustration, as the number of columns and the number of keys in each column is a matter of choice. From FIGS. 5 and 6, it will be seen that keys 12-K to 18-K are connected to voting spindles 12-S to 18-S and are operable to rotate said spindles in vote-casting direction and back. The voting keys and voting spindles correspond to, and for the purpose of the disclosure can be assumed to be identical, in structure and operation, with keys (30) and spindle (38) of Shoup Patent 2,054,102. Since the structure and operation of all voting spindles and their associated keys are the same, it is thought that a complete description of only two of them, such as spindles 12-S and 13-S, will suffice.

As can be seen from FIGS. 5 and 6, voting spindles 12-S and 13-S are connected to arms 20 and 21 of over-center toggles, the other links 22 and 23 of which are connected to pins 24 and 26 which are slidable in slots 28 in supporting brackets 30. The pins are connected to the adjacent ends of flexible rods, or wires, 32 and 34 which are flexible enough to pass and move through rigid tubes 36 and 38 which are bent, as shown in FIG. 5, so as to translate the horizontal reciprocation of enlarged rods 40, 42, which are carried by the opposite ends of wires 32, 34, relative to the vertical portions 44 and 46 of the tubes. The vertical portions of the tubes are secured to fixed frames 47.

Rods 40, 42, carry punches 48 and 50, each of which has an enlarged punching head 51. Punches 48 and 50 are adapted to slide freely in bores 52 and 53 formed in a movable stripper plate 54. Punch heads 51 are adapted to sever and remove pre-scored areas A, X, C, K, N, M, etc., from punch card 56, a portion of which is shown in FIG. 9. The prescored portions referred to correspond to, and are identified with, specific voting spindles in specific vertical columns and specific horizontal rows and carry coded information so that the punching out of pre-scored portion A of the card will convey one meaning and so that punching out portion M will convey another.

Card 56 is supported by a conventional back-up or punch board 58 (I.B.M.) which is provided with T-shaped members formed of fairly rigid stems 59 and fairly resilient cross-heads 60, whereby as a punch head 51 passes through the card, it bends the corresponding cross-heads 60 downwardly, as shown in FIG. 10, to permit the severed portion, such as portion M, to enter the space between adjacent stems 59. When the punch is withdrawn, the adjacent portions of resilient cross-heads 60 resume their horizontal positions in which they strip the severed card portion M from the punch, as shown in FIG. 10. From inspection of FIGS. 5 and 6, it will be seen that when a voting spindle, such as spindle 13, is turned in vote-casting direction, its toggle moves corresponding pin 26 to the left to move the corresponding punch 48 downwardly, as viewed in FIGS. 5, 7 and 8. It will be noted that, even when a punch is in its lowest position, as in the position of punch 48 in FIG. 7, it will still not reach card 56 as long as the stripper plate 54 and punch board 58 are in the low position of FIG. 7. In other words, while rotation of a spindle is enough to set the machine to cast a vote through the conventional vote recording mechanism of a Shoup voting machine, it is not enough to cause the corresponding punch to puncture card 56. On the contrary, the punching of the card is effected partly by moving the punches down by rotation of the corresponding spindles, as above set forth, and partly by moving the card upwardly toward the punches a distance sufficient to cause the lowered punches to pass through the card, as shown by punch 48 in FIGS. 7 and 8. Conveniently, the card is raised or lowered by the mechanism illustrated in FIGS. 3 and 4, from which it will be seen that punch board 58 is secured, by bolts 64, to stripper plate 54 and that stripper plate 54 is secured, as at 66, to racks 68 and 70 which are in mesh with gears 72 and 74 on shaft 75 and to racks 76 and 78 which are in mesh with gears 80 and 82 on shaft 83. Shaft 75 is rotated by handle 86 which is keyed to it, as at 88. Shaft 75 also carries gear 90 which is connected, by a conventional gear train, to gear 92 on shaft 83, whereby rotation of shaft 75 by handle 86 also rotates shaft 83. It will be understood that movement of handle 86 to the broken line position of FIG. 1, rotates shafts 75 and 83 in a direction to raise stripper plate 54 and punch board 58, and vice versa.

The operation is as follows:

When handle 86 is in the solid line position of FIG. 1, the voting spindles are released for use by the voter, that is, they may be turned in vote-casting direction or back. A voter ready to use the machine and wishing to use the card inserts his card through slot 94 into the space between punch board 58 and stripper plate 54. The size and shape of the card are such that, when it is inserted as far as it will go, the various coded, pre-scored areas, A, X, C, K, M, etc., will be in registration with the punches connected to selected voting spindles. In the present case, it can be assumed that coded areas A and M will be in registration with punches 50 and 48, respectively. Rotation of key K-13 in vote-casting direction rotates corresponding voting spindle S-13 (FIG. 5) in a direction to lower punch 48. FIG. 7. It will be noted that, in the lower position, punch 48 is still out of reach of card 56. It will also be remembered that turning a voting key in vote-casting direction does not, of itself, cast a vote. It only sets up the vote counters so that, when the machine is "cleared" or restored for use by a subsequent voter, the vote cast py the previous voter is actually recorded (Shoup patents). Therefore, if a voter changes his mind, he can turn key 13-K back to the non-voting position and punch 48 will move up until it is in the same position as punch 50 in FIG. 7 and no vote will be recorded by the voting machine and the card will not be punctured. When the voter has made up his mind, he moves handle 86 to the broken line position. This raises the stripper plate 54, card 56 and punch board 58 and causes punch 48, and other punches that may have been lowered, to pass through card 56 to remove portion M and other portions which correspond to the lowered punches. It will be remembered that in a conventional Shoup voting machine, opening the curtain to allow the voter to come out of the booth records the vote and re-sets the machine for use by the next voter. The manner in which a Shoup voting machine is "cleared" to record the votes cast and to restore, or re-set the machine for use by the next voter, is set forth in the Shoup patents. For the purpose of this disclosure, it is only necessary to remember that clearing the machine rotates the voting spindles to their un-voted position and raises any punches which may have been lowered.

The machine above described can constitute an independent voting mechanism, but it can also be annexed to a Shoup type voting machine by merely attaching the toggle links of this invention to the ends of voting spindles (38) of Shoup Patent 2,054,102, whereby, when voting keys (30) of said Shoup patent are turned in vote-casting direction, or back, in the manner set forth in said Shoup patent, the toggles of this invention will be actuated to raise and lower the corresponding punches of the present disclosure. It will be noted that the attachment of the toggles of this invention to the voting spindles (38) of Shoup Patent 2,054,102, or to the voting spindles of any other voting machine, does not in any way affect the structure of the voting machine itself. When the parts of the present disclosure are applied to a voting machine, handle 86 can be operated manually, or it can be eliminated and shaft 83 can be tied, by link 97, to the mechanism which opens and closes the curtain, and releases the voting mechanism for use and clears and re-sets the machine for further use so that the punch board 58 and stripper plate 54 will be moved up and down synchronously with the vote recording operation and so that punches 48 and 50 will be moved up and down with the rotation of the voting spindles to vote-casting position, or back.

In the present disclosure, an auxiliary operating handle 96 is shown which is operable from without the machine to raise and lower the stripper plate. This can be operated by an election officer from outside, either as a check against handle 86 which is controlled by the voter, or to show from the outside that handle 86 was indeed moved up and down. If desired, handle 86 can be dispensed with and the machine can be operated by auxiliary handle 96, exclusively. While not shown in the drawing, it will be understood that, when the present machine is used alone, it will have a curtain which can be opened and closed manually, or by the mechanism shown in the Shoup patents. When used as a part of a Shoup type voting machine, the curtain shown in Shoup Patent 2,054,102 and the mechanism which operates it will do.

Slot 94 is formed in a fixed plate 98 and so arranged as to register with the space 93 between stripper plate 54 and punch board 58 when the latter are in their lower position so as to permit insertion of the card before voting and to permit removal of the punched card after voting. When the stripper plate and punch board are raised to punch card 56, the card will be impaled on the punches and slot 94 will be out of alignment with space 93. Therefore the card can not be withdrawn until the machine is cleared; until the punches retracted and until stripper plate 54 and punchboard 58 are lowered to bring space 93 back into registration with the slot 94.

For the purpose of this disclosure and claims, the word "card" means any member which carries areas of coded information and which can be penetrated, dented, or marked by the punches which may be pointed to make holes, or which may be inked to leave marks on selected areas of the card.

What I claim is:

A voting machine for recording the number of votes and for simultaneously punching a coded card, said machine including
- a punchboard,
- a stripper plate above, and spaced from, said punchboard, to provide a card receiving space,
- means mounting said stripper plate and said punchboard for movement to an upper or to a lower position relative to said punch,
- a fixed plate adjacent, and preventing access to, said stripper plate and said punchboard, said fixed plate having a slot therein which aligns with said card receiving space when said stripper plate and said punchboard are in their lower position to permit insertion and withdrawal of said card only in said lower position,
- a movable punch mounted adjacent said card receiving space,
- a voting spindle movable by the voter to a voting, or non-voting position,
- a flexible element connecting said voting spindle to said punch whereby movement of said voting spindle to voting position moves said punch toward said space and vice versa,
- said movement of said punch toward said space being insufficient to bring said punch into engagement with said card, and
- means for raising said stripper plate and said punchboard to cause said punch to engage said card and for lowering said stripper plate and said punchboard to disengage said card from said punchboard to bring said space into alignment with said slot to permit withdrawal of said card.

References Cited by the Examiner
UNITED STATES PATENTS

| | | | |
|---|---|---|---|
| Re. 20,746 | 5/38 | Kurowski | 234—91 X |
| 1,680,054 | 8/28 | Lebeis | 234—91 |
| 1,701,436 | 2/29 | Baker | 234—91 X |
| 1,705,091 | 3/29 | Langford | 235—50 |
| 1,947,157 | 2/34 | Harris | 235—50 |
| 2,195,848 | 4/40 | Carroll | 235—50 |
| 2,796,127 | 6/57 | Johnson | 234—76 |
| 3,094,277 | 6/63 | Wilcox | 235—50 |
| 3,104,805 | 9/63 | Holicky | 235—50 |

LEO SMILOW, *Primary Examiner.*

LEYLAND M. MARTIN, *Examiner.*